(12) United States Patent
Sheen et al.

US007758769B2

(10) Patent No.: US 7,758,769 B2
(45) Date of Patent: Jul. 20, 2010

(54) DE-ICING METHOD

(75) Inventors: Alan David Sheen, Winterley (GB); Neil Alexander Rosenburgh, Winsford (GB)

(73) Assignee: Salt Union Limited (GB)

( * ) Notice: Subject to any disclaimer, the term of this patent is extended or adjusted under 35 U.S.C. 154(b) by 0 days.

(21) Appl. No.: 12/144,165

(22) Filed: Jun. 23, 2008

(65) Prior Publication Data

US 2009/0026411 A1 Jan. 29, 2009

(30) Foreign Application Priority Data

Jun. 23, 2007 (GB) .................................. 0712175.9

(51) Int. Cl.
*C09K 3/18* (2006.01)
(52) U.S. Cl. .......................... 252/70; 106/13; 427/136; 427/212; 427/220
(58) Field of Classification Search .................... 252/70; 106/13; 427/136, 212, 220
See application file for complete search history.

(56) References Cited

U.S. PATENT DOCUMENTS

| 4,430,240 | A | 2/1984 | Sandvig et al. |
| 4,585,571 | A | 4/1986 | Bloom |
| 4,664,832 | A | 5/1987 | Sandvig et al. |
| 4,668,416 | A | 5/1987 | Neal |
| 4,676,918 | A | 6/1987 | Toth et al. |
| 4,746,449 | A | 5/1988 | Peel |
| 4,746,499 | A | 5/1988 | Roberts et al. |
| 4,980,282 | A | 12/1990 | de Troostembergh et al. |
| 4,986,925 | A | 1/1991 | Fiske |
| 5,302,307 | A | 4/1994 | Ireland |
| 5,531,931 | A | 7/1996 | Koefod |
| 5,635,101 | A | 6/1997 | Janke et al. |
| 5,709,812 | A | 1/1998 | Janke et al. |
| 5,709,813 | A | 1/1998 | Janke et al. |
| 5,849,356 | A | 12/1998 | Gambino et al. |
| 5,853,610 | A | 12/1998 | Kaes |
| 5,876,621 | A | 3/1999 | Sapienza |
| 5,919,394 | A | 7/1999 | Janke et al. |
| 5,922,240 | A | 7/1999 | Johnson et al. |
| 5,932,135 | A | 8/1999 | Janke et al. |
| 5,965,058 | A | 10/1999 | Janke et al. |
| 5,980,774 | A | 11/1999 | Sapienza |
| 6,080,330 | A | 6/2000 | Bloomer |
| 6,129,857 | A | 10/2000 | Sapienza |
| 6,149,834 | A | 11/2000 | Gall et al. |
| 6,156,227 | A | 12/2000 | Koefod |
| 6,299,793 | B1 | 10/2001 | Hartley et al. |
| 6,315,919 | B1 | 11/2001 | Sapienza |
| 6,398,979 | B2 | 6/2002 | Koefod et al. |
| 6,416,684 | B1 | 7/2002 | Bloomer |
| 6,436,310 | B1 | 8/2002 | Hartley et al. |
| 6,440,325 | B1 | 8/2002 | Hartley et al. |
| 6,468,442 | B2 | 10/2002 | Bytnar |
| 6,506,318 | B1 | 1/2003 | Sapienza et al. |
| 6,540,934 | B2 | 4/2003 | Sapienza et al. |
| 6,544,434 | B2 | 4/2003 | Sapienza |
| 6,582,622 | B1 | 6/2003 | Hartley et al. |
| 6,596,188 | B1 | 7/2003 | Hartley et al. |
| 6,599,440 | B2 | 7/2003 | Hartley et al. |
| 6,605,232 | B1 | 8/2003 | Montgomery et al. |
| 6,641,753 | B1 | 11/2003 | Bloomer |
| 6,770,217 | B2 | 8/2004 | Hartley et al. |
| 6,800,217 | B2 | 10/2004 | Koefod et al. |
| 6,805,811 | B2 | 10/2004 | Hartley et al. |
| 6,827,873 | B2 | 12/2004 | Hartley et al. |
| 6,843,931 | B2 | 1/2005 | Sapienza |
| 6,849,199 | B2 | 2/2005 | Vickers et al. |
| 6,852,247 | B2 | 2/2005 | Bytnar |
| 6,861,009 | B1 | 3/2005 | Leist |
| 6,890,451 | B2 | 5/2005 | Sapienza et al. |
| 6,905,631 | B2 | 6/2005 | Hartley et al. |
| 6,946,282 | B2 | 9/2005 | Blaszczyk et al. |
| 7,014,789 | B2 | 3/2006 | Hartley et al. |
| 7,033,422 | B2 | 4/2006 | Bloomer |
| 7,045,076 | B2 | 5/2006 | Hartley et al. |
| 7,100,760 | B2 * | 9/2006 | Hoerle et al. ............... 198/625 |
| 7,135,126 | B2 | 11/2006 | Hartley et al. |
| 7,138,071 | B2 | 11/2006 | Sapienza et al. |
| 7,147,797 | B2 | 12/2006 | Koefod et al. |
| 7,168,844 | B2 * | 1/2007 | Hoerle et al. ............ 366/162.4 |
| 7,208,101 | B2 | 4/2007 | Hartley et al. |

(Continued)

FOREIGN PATENT DOCUMENTS

DE 40 34 217 5/1991

(Continued)

OTHER PUBLICATIONS

Translation of German Patent Specification No. DE4129073 (Mar. 1993).*

(Continued)

*Primary Examiner*—Anthony J Green
(74) *Attorney, Agent, or Firm*—Hovey Williams LLP

(57) ABSTRACT

A method of reducing the build up of ice or snow on roads. The method comprising mixing a solid de-icing material such as rock salt with a non brine additive solution such as an aqueous solution of a refined molasses stream. The de-icing material and additive solution being carried on a lorry 10, and being mixed immediately prior to spreading on a road.

16 Claims, 1 Drawing Sheet

U.S. PATENT DOCUMENTS

Figure 1:
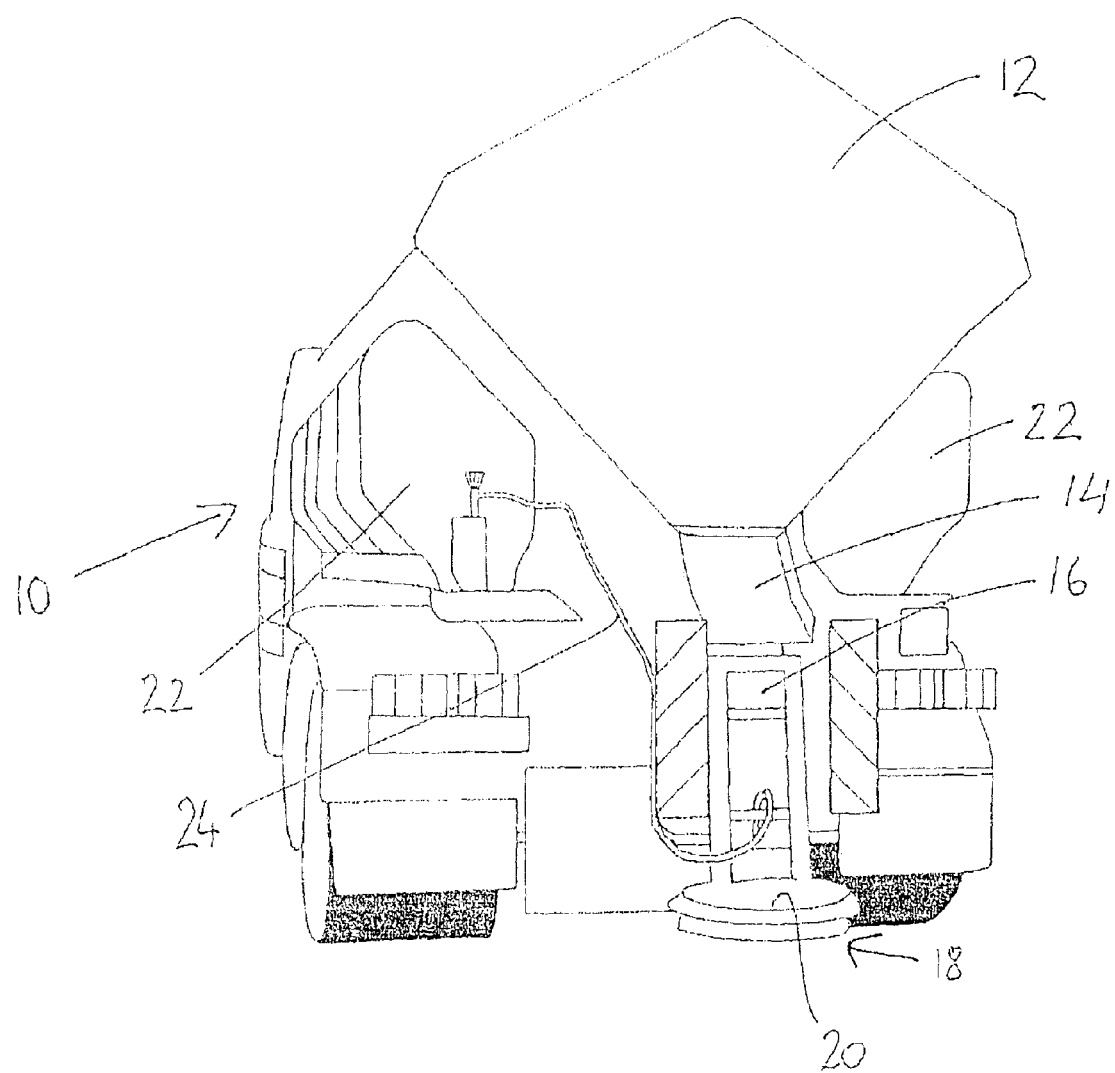

| | | |
|---|---|---|
| 7,229,568 B2 | 6/2007 | Sapienza |
| 7,294,285 B2 | 11/2007 | Koefod et al. |
| 7,306,749 B2 | 12/2007 | Hartley et al. |
| 7,309,451 B2 | 12/2007 | Koefod |
| 7,314,577 B2 | 1/2008 | Koefod |
| 2002/0171062 A1 | 11/2002 | Koefod et al. |
| 2003/0107022 A1 | 6/2003 | Bytnar |
| 2003/0136940 A1 | 7/2003 | Sapienza et al. |
| 2003/0168625 A1 | 9/2003 | Sapienza et al. |
| 2003/0205694 A1 | 11/2003 | Sapienza et al. |
| 2004/0079919 A1 | 4/2004 | Sapienza et al. |
| 2004/0256593 A1 | 12/2004 | Hartley et al. |
| 2004/0262568 A1 | 12/2004 | Hartley et al. |
| 2005/0001198 A1 | 1/2005 | Bytnar |
| 2005/0062013 A1 | 3/2005 | Sapienza et al. |
| 2006/0022171 A1 | 2/2006 | Leist |
| 2006/0169947 A1 | 8/2006 | Leist |
| 2006/0175574 A1 | 8/2006 | Bytnar |
| 2006/0180786 A1 | 8/2006 | Sapienza et al. |
| 2006/0202156 A1 | 9/2006 | Sapienza et al. |
| 2007/0012896 A1 | 1/2007 | Sapienza et al. |
| 2007/0176139 A1 | 8/2007 | Sapienza et al. |
| 2007/0194272 A1 | 8/2007 | Sapienza |
| 2007/0227398 A1 | 10/2007 | Koefod |
| 2007/0278446 A1 | 12/2007 | Koefod |
| 2007/0295932 A1 | 12/2007 | Bytnar |
| 2008/0006174 A1 | 1/2008 | Sapienza et al. |

FOREIGN PATENT DOCUMENTS

| | | |
|---|---|---|
| DE | 41 29 073 | 3/1993 |
| WO | WO 2005/023956 | 3/2005 |

OTHER PUBLICATIONS

UK Search Report dated Sep. 5, 2008 in related Application No. GB 0810929.0.

EP Search Report dated Nov. 11, 2008 in related Application No. EP 08 25 2055.2.

* cited by examiner

DE-ICING METHOD

RELATED APPLICATIONS

This application claims priority to U.K. Patent Application No. 0712175.9, filed on Jun. 23, 2007. The foregoing is incorporated by reference herein.

BACKGROUND OF THE INVENTION

1. Field of Invention

This invention concerns a method of reducing the build up of ice or snow on roads, and also a vehicle for use in spreading de-icing compositions on roads to prevent the build up of snow or ice.

2. Description of the Prior Art

Salt or other solid de-icing materials are often applied onto roads during cold weather to prevent the formation or build up of ice or snow on the road surface. Such materials are generally dispensed from the rear of a specialised vehicle. A significant proportion of material spread in this way can be wasted, and particularly due to fine material spreading further than is required. This can result in potential pollution and damage to the surrounding environment. Such further spreading also means that materials are being wasted and therefore extra costs incurred.

Proposals have been made to pre-wet salt or other de-icing materials with brine prior to spreading. Significant disadvantages have been encountered with these proposals. Brine is corrosive to steel and thus requires special handling and storage. Significant additional infrastructure is required to use brine, in producing and handling this material. Brine may also have deleterious effects on the surrounding environment.

SUMMARY OF THE INVENTION

The present invention broadly solves the problems of the prior art by providing a de-icing method that results in very little to no corrosion. In that method, an additive solution that is essentially free of brine and a solid de-icing material are provided. The additive solution and solid de-icing material are mixed together to form a non-brine de-icing mixture immediately prior to applying that mixture to a road.

BRIEF DESCRIPTION OF THE DRAWING FIGURES

FIG. 1 is a perspective rear view of a lorry according to the invention for spreading de-icing/anti-icing materials on roads.

DETAILED DESCRIPTION OF THE INVENTION

According to the present invention there is provided a method of reducing the build up of ice or snow on roads, the method comprising mixing a solid de-icing material with a non brine additive solution immediately prior to spreading this mixture onto the roads.

The additive may be mixed with water to form an additive solution, immediately prior to mixing of the solid de-icing material with the additive solution.

The solid de-icing material may be any of sodium chloride, magnesium chloride, calcium chloride, potassium chloride, CMA, sodium acetate, urea, sodium formate or mixtures thereof. The de-icing material may be rock salt. In a preferred embodiment, the solid de-icing material is a salt that has not been pre-treated with any sort of material, including molasses or steepwater.

The additive solution may be mixed as about 10 to about 90% by volume with the de-icing material, and may be about 20 to about 40% by volume with the de-icing material.

The additive solution may be mixed with the de-icing material so as to provide about 1 to about 10% weight % of the additive relative to the de-icing material, and may be about 2.5 to about 3.5% of the additive relative to the de-icing material.

As mentioned above, the additive solution is a non brine additive solution. That is, the additive solution is preferably essentially free of brine unlike most additive solutions to which brine is added and desired. The additive solution according to the invention preferably comprises less than about 1% by weight, brine, more preferably less than about 0.5% by weight brine, and even more preferably about 0% by weight brine, based upon the total weight of the additive solution taken as 100% by weight. As known by those skilled in the art, brine is water saturated with salt (typically sea or lake salt water). Thus, in one embodiment, the additive solution of the present invention is also essentially free of salts such as magnesium chloride, calcium chloride, sodium chloride, potassium chloride, etc. The additive solutions of the invention comprise less than about 2% by weight salt, preferably less than about 1% by weight salt, and even more preferably less than about 0.6% by weight salt, based upon the weight of the additive solution taken as 100% by weight.

The material mixture may be spread from a vehicle, which vehicle carries the de-icing material and the additive solution, and which includes means for mixing the de-icing material and the additive solution. At least the parts of the vehicle which carry the de-icing material may be sprayed with the additive or the additive solution, prior to filling the vehicle with the de-icing material.

In one aspect of the invention the additive may have the following composition:

| | |
|---|---|
| Moisture | about 35 to about 50% |
| Monosaccharides | about 2 to about 10% |
| Disaccharides | about 1 to about 15% |
| Other carbohydrates and polysaccharides | about 1 to about 10% |
| Amino acid carbohydrate complexes | about 1 to about 10% |
| Amino acids | about 1 to about 5% |
| Other Nitrogenous compounds | about 10 to about 20% |
| Organic acids | about 1 to about 10% |
| Total mineral salts | about 5 to about 25% |

The mineral salts may have:

| | |
|---|---|
| Potassium | about 2 to about 10% |
| Calcium | about 1 to about 5% |
| Sodium | about 0.1 to about 0.5% |
| Magnesium | about 0.1 to about 3.0% |
| Chloride | about 0.1 to about 3.0% |
| Sulphate | about 1 to about 5% |

The additive may have the following physical characteristics;
 a specific gravity of between about 1.2 and about 1.4
 a viscosity of about 200 to about 800 cps at −30° C.
 a pH of about 5 to about 8.
 The additive may be in the forming of a dark brown mobile liquid, with a slight odour In a second aspect of the invention the additive may have the following composition:

| | |
|---|---|
| Glycerol | about 75 to about 99.9% |
| Water | about 0.05 to about 20% |
| Salt content (NaCl or K₂SO₄) | about 0.01 to about 10% |
| Ash | about 0.01 to about 7% |
| Material Organic Non-Glycerol (Free Fatty Acids) | about 0.01 to about 5% |
| Methanol | about 0.01 to about 0.5% |

The additive may have the following physical characteristics;
a viscosity of about 50 to about 4000 cps at 20° C.
a pH of about 1.5 to about 8.

The additive may be in the form of a thin syrup like liquid which is colourless or is a light or darker brown colour.

The additive may be any of:
(i) a range of materials from agricultural by-products; such as one or more of a co-product of the refining of sugar beet or sugar cane, or such as those from cereals, starch and carbohydrate syrup production, or from co-products from the subsequent processing or fermentation of cereal starch, sugar and other carbohydrate co-products. The additive may be a co-product of the production of sucrose from the processing of sugar cane or sugar beet. The additive may contain a refined cane molasses stream, a refined beet molasses stream, or a mixture thereof.
(ii) a range of solubles from different production industries; including steepwater solubles produced, for example, as by-products from a wet milling process of corn; or vintners condensed solubles comprising by-products from the fermentation and production of wine from grapes and other fruit, as well as from grains; or brewers distillery/condensed solubles (BDS/BCS), for example, as by-products from a commercial beer brewing process.
(iii) by-products from the production of cheese from various milks, commonly known in the cheese making industry as "whey."
(iv) by-products from the production of biodiesel, such as processed glycerol streams with reduced (e.g., less than about 0.5% by weight) or no fatty acid content.

The additive may include liquid non chloride de-icers such as potassium acetate, potassium formate, ethylene glycol, polyethylene glycols, propylene glycol, and/or polypropylene glycols.

The additive may include a suitable corrosion inhibitor.

The invention also provides a vehicle for spreading materials to reduce the build up of ice or snow on roads, the vehicle including means for storing the solid de-icing material, and means for mixing the solid de-icing material with an additive solution immediately prior to spreading the mixture onto the roads.

The vehicle may include storage means for the additive solution.

In an alternative configuration the vehicle may include means for mixing an additive with water to form an additive solution, immediately before mixing the additive solution formed with the solid de-icing material. The vehicle may include storing means for the additive and for water, and means for supplying the water in a warm feed. The storing means may be tanks.

The vehicle may be arranged to permit selective spreading of just de-icing material.

EXAMPLES

Embodiments of the present invention will now be described by way of example only, and with reference to the single FIGURE (FIG. 1) of the accompanying drawings which is a perspective rear view of a lorry according to the invention for spreading de-icing/anti-icing materials on roads.

An additive was provided with the following composition:—

| | |
|---|---|
| Moisture | 40% |
| Monosaccharides | 5% |
| Disaccharides | 7% |
| Other carbohydrates and polysaccharides | 4% |
| Amino acid carbohydrate complexes | 5% |
| Amino acids | 3% |
| Other Nitrogenous compounds | 13% |
| Organic acids | 3% |
| Total mineral salts | 20% |

The compositions of the major mineral salts were as follows:

| | |
|---|---|
| Potassium | 6% |
| Calcium | 4% |
| Sodium | 0.5% |
| Magnesium | 0.3% |
| Chloride | 1.4% |
| Sulphate | 3% |

The additive had the following physical characteristics;
a specific gravity of 1.32
a viscosity of 400 cps at −30° C.
a pH of 6-7.

The additive was dark brown in colour with a mild, non-pungent odour. The additive was mixed with water to provide a solution with one part additive to nine parts water.

The drawing of FIG. 1 shows a lorry 10 usable in a method of reducing the build up of ice or snow on roads according to the invention. The lorry 10 includes a hopper 12 extending to the rear thereof, in which a solid de-icing material such as rock salt can be located. A downwardly and rearwardly extending chute leads from the hopper 12, which directs material into a downwardly extending passage 16 from which material exits into a mixing arrangement 18. In the mixing arrangement 18 a downwardly facing domed cover 21 is provided in which a spinning agitator (not shown) is provided to direct the salt outwardly.

One or more saddle tanks 22 are provided on the lorry 10 to the side of the hopper 12. The saddle tank 22 (or each saddle tank 22) can contain an additive solution as outlined above. Pipework 24 extends from each tank 22 into the mixing arrangement 18, such that the additive solution and the solid de-icing material are mixed immediately prior to being spread from the lorry 10. That is, the additive solution and solid de-icing material are mixed together within about 2 seconds prior to spreading, and more preferably within about 1 second prior to spreading the mixture on a road.

The additive solution could be formed at a central depot and stored in tanks ready for filling the tank or tanks 22. Alternatively the additive can be supplied in bulk and ready to use and stored within a bulk tank until required. Such an arrangement is well suited to large depots for busy highways and motorways requiring ease of use, or for smaller depots limited by space or infrastructure.

In use the additive solution is mixed with rock salt in the mixing arrangement 18, immediately before the wetted rock salt thus formed is directed onto a road. The solution is mixed with the rock salt in about a 30:70 proportion to provide substantially 3% of the additive in the spread material. The inside of the hopper 12 may be sprayed with the additive solution or the additive itself, dependent on the viscosity thereof. This has been found to provide significant anti corrosive effects in the hopper 12.

In an alternative arrangement the lorry may carry the additive separately from water supply, which may be held in one or more containers for making an additive solution prior to mixing with the salt. A connection will be provided between the additive and water containers to permit mixing thereof prior to mixing with a de-icing material. Heating means will probably be provided for the water containers to prevent freezing of the water therein.

The additive may have a wide range of compositions as outlined above. A typical composition would be a co-product of the production of sucrose from sugar cane and sugar beet, with mixtures of a refined cane molasses stream and a refined beet molasses stream.

The use of the additive/additive solution provides significant advantages in de-icing:

(i) the addition of the additive solution provides for significantly improved spreading of the material and the avoidance of fine particulate material spreading beyond the required area allowing for reduced spread rates and reduced wasting of de-icing materials resulting in a substantial social, environmental and cost benefit.

(ii) the addition of the additive solution affects the colligative properties of water, resulting most relevantly the lowering of the freezing point.

(iii) the addition of the additive solution also extends to the anti-corrosive ability of the compositions compared with a typical brine pre-wetting solution.

The above described examples provide significant advantages in providing better, more focused spreading/application of solid de-icing materials, and thus reduce the amount of material required. Applying the rock salt pre-wetted reduces the activation period for the rock salt creating a brine, relative to when applied as virgin rock salt. Therefore the advantages of pre-wetting are obtained without the disadvantage of having to store and handle brine. The additional costs involved in the method of the invention are relatively small, and particularly in comparison with the cost of providing the required infrastructure to produce brine. The additive reduces the environmental damage caused by corrosion, and also excessive spreading.

The lorry 10 may be arranged to permit dry salt to be spread if required without the additive solution, for instance for use with snow, where ideally larger qualities of dry rock salt will be applied.

Various other modifications may be made without departing from the scope of the invention. For instance, a solid de-icer material other than rock salt could be used, and all earth materials are potential components such as sodium chloride, magnesium chloride, calcium chloride and potassium chloride. Other known chemical substances could be used such as CMA, urea, sodium formate, sodium acetate and mixtures thereof. As indicated above the additive may have a wide range of compositions.

The proportion of the additive solution relative to the de-icing material can be chosen and if necessary varied, as required. With a high proportion of additive solution a slurry could be formed with the de-icing material.

The additive or additive solution may be supplied pre-packed, such that the pack of material can simply be located in a required location on the vehicle. The vehicle may include a device for automatically opening the package, or preopening may be required.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A deicing method comprising:
providing an additive solution that is essentially free of brine, said additive solution having a pH of from about 1.5 to about 8, and said additive solution having the following composition:

| | |
|---|---|
| Moisture | about 35 to about 50%; |
| Monosaccharides (glucose/fructose) | about 2 to about 10%; |
| Disaccharides (sucrose) | about 1 to about 15%; |
| Other carbohydrates and polysaccharides | about 1 to about 10%; |
| Amino acid carbohydrate complexes | about 1 to about 10%; |
| Amino acids | about 1 to about 5%; |
| Other Nitrogenous compounds | about 10 to about 20%; |
| Organic acids | about 1 to about 10%; and |
| Total mineral salts | about 5 to about 25%; | providing a solid de-icing material;
mixing said additive solution with said solid de-icing material to form a non-brine de-icing mixture, wherein said additive solution is mixed at about 10 to about 90% by volume relative to the de-icing material; and
applying said mixture to a road, wherein said mixing takes place immediately prior to said applying.

2. The method of claim 1, further comprising mixing an additive with water to form the additive solution immediately prior to mixing the additive solution with the solid de-icing material.

3. A method according to claim 1, characterised in that the solid de-icing material is any of sodium chloride, magnesium chloride, calcium chloride, potassium chloride, calcium magnesium acetate, sodium acetate, urea, sodium formate or mixtures thereof.

4. A method according to claim 3, characterised in that the solid de-icing material is rock salt.

5. A method according to claim 1, characterised in that the additive solution is mixed as about 20 to about 40% by volume relative to the de-icing material.

6. A method according to claim 1, characterised in that the additive solution is mixed with the de-icing material so as to provide about 1 to about 10% weight % of the additive relative to the de-icing material.

7. A method according to claim 6, characterised in that the additive solution is mixed with the de-icing material so as to provide about 2.5 to about 3.5 weight % of the additive relative to the de-icing material.

8. A method according to claim 1, characterised in that the mixture is spread from a vehicle, which vehicle carries the de-icing material and the additive solution, and which is equipped to mix the de-icing material and the additive solution.

9. A method according to claim 8, characterised in that at least the parts of the vehicle which carry the de-icing material are sprayed with the additive solution, prior to filling the vehicle with the de-icing material.

10. A method according to claim 8, characterised in that the vehicle is arranged to permit selective spreading of just de-icing material without additive solution.

11. A method according to claim 1, characterised in that the additive is any of:
  (i) a range of materials from agricultural by-products including one or more of a co-product of the refining of sugar beet or sugar cane, or a co-product from cereals, starch and carbohydrate syrup production, or co-products from processing or fermentation of cereal starch, sugar and other carbohydrate co-products;
  (ii) a co-product of the production of sucrose from the processing of sugar cane or sugar beet;
  (iii) a material containing a refined cane molasses stream, a refined beet molasses stream, or a mixture thereof;
  (iv) a range of solubles from different production industries; including steepwater solubles produced as by-products from a wet milling process of corn; or vintners condensed solubles comprising by-products from the fermentation and production of wine from grapes and other fruit, or from grains; or brewers distillery/condensed solubles (BDS/BCS) as by-products from a commercial beer brewing process;
  (v) by-products from the production of cheese from various milks, commonly known in the cheese making industry as "whey";
  (vi) by-products from the production of biodiesel including processed glycerol streams with reduced or no fatty acid content.

12. A method according to claim 1, characterised in that the additive includes liquid non chloride de-icers selected from the group consisting of potassium acetate, potassium formate, ethylene glycol, polyethylene glycols, propylene glycol, and polypropylene glycols, and may include a suitable corrosion inhibitor.

13. The method of claim 1, wherein said additive solution comprises less than about 1% by weight brine, based upon the weight of the additive solution taken as 100% by weight.

14. The method of claim 1, wherein said additive solution comprises less than about 0.5% by weight salt, based upon the weight of the additive solution taken as 100% by weight.

15. The method of claim 1, wherein said mixing takes place within about 2 seconds of applying said mixture to the road.

16. A deicing method comprising:
  providing an additive solution that is essentially free of brine, said additive solution having a pH of from about 1.5 to about 8, and said additive solution having the following composition:

| | |
|---|---|
| Glycerol | about 75 to about 99.9%; |
| Water | about 0.05 to about 20%; |
| Salt content (NaCl or K2SO4) | about 0.01 to about 10%; |
| Ash | about 0.01 to about 7%; |
| Material Organic Non-Glycerol (Free Fatty Acids) | about 0.01 to about 5%; and |
| Methanol | about 0.01 to about 0.5%; | providing a solid de-icing material;
  mixing said additive solution with said solid de-icing material to form a non-brine de-icing mixture, wherein said additive solution is mixed at about 10 to about 90% by volume relative to the de-icing material; and
  applying said mixture to a road, wherein said mixing takes place immediately prior to said applying.

* * * * *